United States Patent [19]
Deffontaines et al.

[11] Patent Number: 5,461,503
[45] Date of Patent: Oct. 24, 1995

[54] COLOR MATRIX DISPLAY UNIT WITH DOUBLE PIXEL AREA FOR RED AND BLUE PIXELS

[75] Inventors: Christophe Deffontaines, Paris; Ambroise Parker, Rueil-Malmaison; Philippe Tison, Argenteuil, all of France

[73] Assignee: Societe d'Applications Generales d'Electricite et de Mecanique Sagem, Paris, France

[21] Appl. No.: 224,525

[22] Filed: Apr. 7, 1994

[30] Foreign Application Priority Data

Apr. 8, 1993 [FR] France ................... 93 04196

[51] Int. Cl.$^6$ .................................................. G02F 1/1343
[52] U.S. Cl. .................................................. 359/68; 359/61
[58] Field of Search .................................. 359/68, 54, 55, 359/61; 345/88

[56] References Cited

U.S. PATENT DOCUMENTS 4,642,619  2/1987  Togashi ..................... 340/701

FOREIGN PATENT DOCUMENTS

| 322106 | 11/1988 | European Pat. Off. . | |
|---|---|---|---|
| 62-208025 | 9/1987 | Japan | 345/88 |
| 651301 | 2/1994 | Japan | 359/68 |
| 2133912 | 8/1984 | United Kingdom . | |

*Primary Examiner*—Anita Pellman Gross
*Assistant Examiner*—James A. Dudek
*Attorney, Agent, or Firm*—Larson & Taylor

[57] ABSTRACT

A color matrix display unit which has a screen having at least three sets of pixels, all pixels in a same one of the three sets being of the same color among red, blue and green and all said pixels of a same one of said sets being distributed in a matrix arrangement comprising rows and columns. A plurality of column conductors each simultaneously addresses all pixels in a same column. A plurality of row conductors each simultaneously addresses all pixels in a same line. Each column conductor allocated to red or blue pixels addresses an overall pixel area that is about double the overall pixel area addressed by one of the column conductors allocated to a green pixel. A drive circuit connected to the column conductors addresses the green pixels with a time or space repetition period which is half the period for red and green pixels.

9 Claims, 3 Drawing Sheets

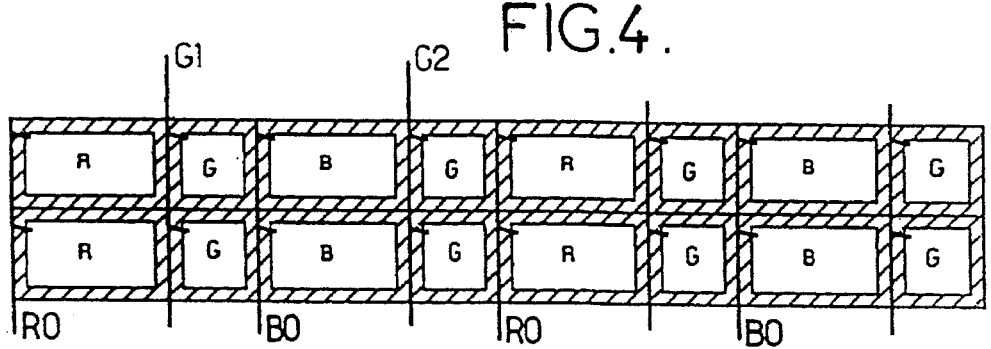
FIG.4.
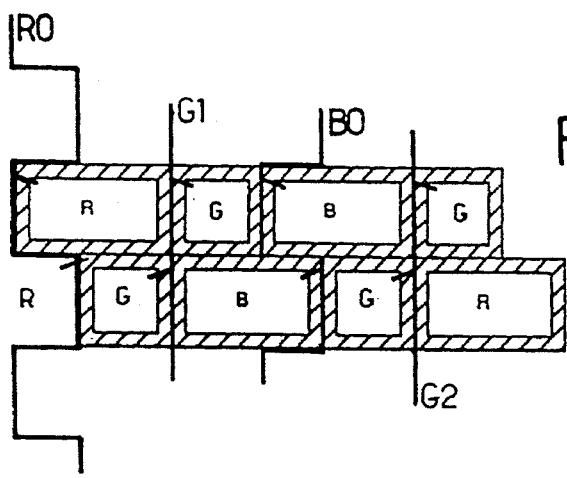
FIG.5.
FIG.6.
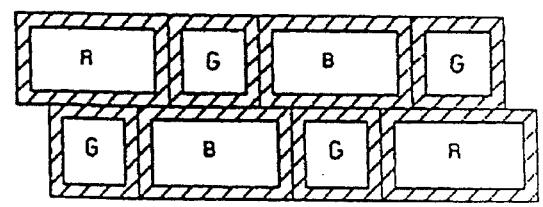
FIG.7
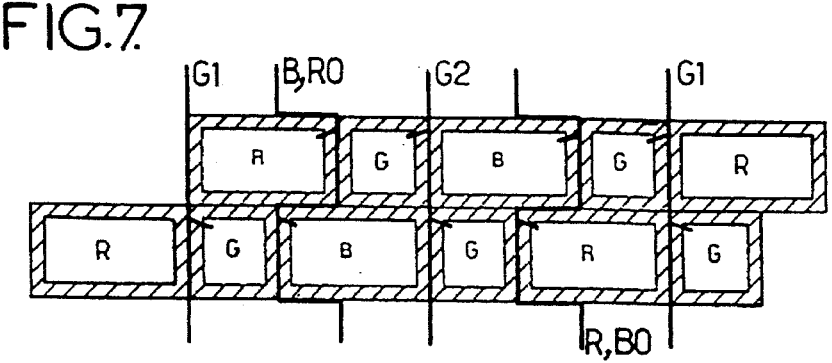

COLOR MATRIX DISPLAY UNIT WITH DOUBLE PIXEL AREA FOR RED AND BLUE PIXELS

BACKGROUND OF THE INVENTION

The present invention relates to colour matrix display units that provide an image in the form of elementary points or "pixels", distributed in a regular array. It relates more particularly to matrix display units of the type including at least three sets of pixels that are respectively green, red, and blue, with the pixels in each set being distributed in a matrix comprising rows and columns, all of the pixels in the same row being simultaneously addressed for writing by respective column conductors, the total active or light-emissive area of the pixels frequently being the same for the three sets so as to achieve a colour balance.

The invention is applicable to very many types of matrix display units, and particular mention may be made of liquid crystal screens (regardless of whether they are of the multiplexed type or of the active matrix type), electrically controlled light emitting screens, screens having an array of light emitting diodes (LEDs), and plasma screens.

In conventional colour matrix display units, each coloured pixel (which for convenience is referred to below as a "macropixel") is made up by juxtaposing at least three pixels each allocated to one of the primary colours (usually green, red, and blue). The brightness of each pixel is modulated, either by adjusting a duty ratio, or more commonly by adjusting luminance, so as to obtain the desired colour.

Several pixel dispositions are widely used. Mention may be made of arrangements in strips (where the three pixels making up the same macropixel are disposed side by side along a common straight line), in triplets (with the three pixels being disposed at the apexes or corners of an equilateral triangle), and in quads (where four pixels are disposed at the corners of a square and represent the three primary colours together with an additional colour or white).

A major problem in making matrix display units lies in the density of the connections to be made. The number of connections between the display proper and its controlling electronics is equal to the number of rows plus the number of columns: for a screen where each macropixel comprises three pixels in a strip, 2 080 connections are required for 640 rows of 480 macropixels. The failure of any connection will cause one or more pixels to go out and will degrade the image. Unfortunately, the risk of failure increases with routing complexity.

Making each macropixel from three (or more) pixels also has the drawback of reducing the aperture factor, i.e. the active fraction of the area of the display unit, or that fraction which actually emits light. Each pixel must be separated from its neighbours by an opaque line in order to allow for manufacturing tolerances and to avoid interference between adjacent pixels. For example, the aperture factor of a present day active matrix liquid crystal screen hardly exceeds 50%. Unfortunately, any reduction in aperture factor can be compensated only by more powerful back lighting.

SUMMARY OF THE INVENTION

It is an object of the present invention to provide a display unit enabling the number of connections to be reduced for given image quality, or conversely, enabling definition to be increased for a given number of connections.

To this end, the invention makes use of the finding that the visual acuity and the sensitivity, in terms of luminance, of the human eye for the colour green are about double what they are for the colours red and blue.

Consequently, it has been found possible to display information concerning red and blue only half as often (in time and/or in space) as information concerning green.

Consequently, there is provided a colour matrix display unit of the above-defined type, wherein each of the column conductors allocated to red or blue pixels is connected to write into an area that is about double the area into which a column conductor allocated to a green pixel writes, and the time or space write period for green pixels is half the write period for red and green pixels.

This basic structure lends itself to a very wide range of embodiments.

In particular, the red, green, and blue pixels may be regularly distributed on successive rows and have substantially the same area. In that case the number of column connectors corresponding to red and blue pixels is halved by controlling two adjacent columns of red or blue pixels simultaneously.

To avoid cross-overs between column conductors, it is then advantageous to split up the column conductor drive circuit into one unit placed on one side of the display and controlling column conductors for red pixels and half of the column conductors for green pixels, and another unit placed on the other side and controlling the column conductors for blue pixels and half the column conductors for green pixels.

Each of the columns may be made up of pixels of the same colour in alignment with one another or else disposed in a quincunx.

In another embodiment, a single row is made of alternating red, green, blue, green, red, green, etc . . . pixels, with the area of each green pixel being substantially half the area of the red and blue pixels. Each column is generally controlled by a distinct conductor allocated to one colour, particularly if the same pixels assigned to a same colour are in alignment. However, it is also possible not to dedicate the column conductors allocated to the red and blue pixels to a particular colour, but to use them in alternation for controlling red pixels in one row, and blue pixels in the following row, particularly when the pixels are in a staggered configuration.

The invention will be better understood from the following description of particular embodiments, given as non-limiting examples. The description refers to accompanying drawings.

BRIEF DESCRIPTION OF THE DRAWINGS

FIG. 4, 5, 6, and 7 are similar to FIG. 2 and show other embodiments;

DETAILED DESCRIPTION OF PARTICULAR EMBODIMENTS

Figure 1:
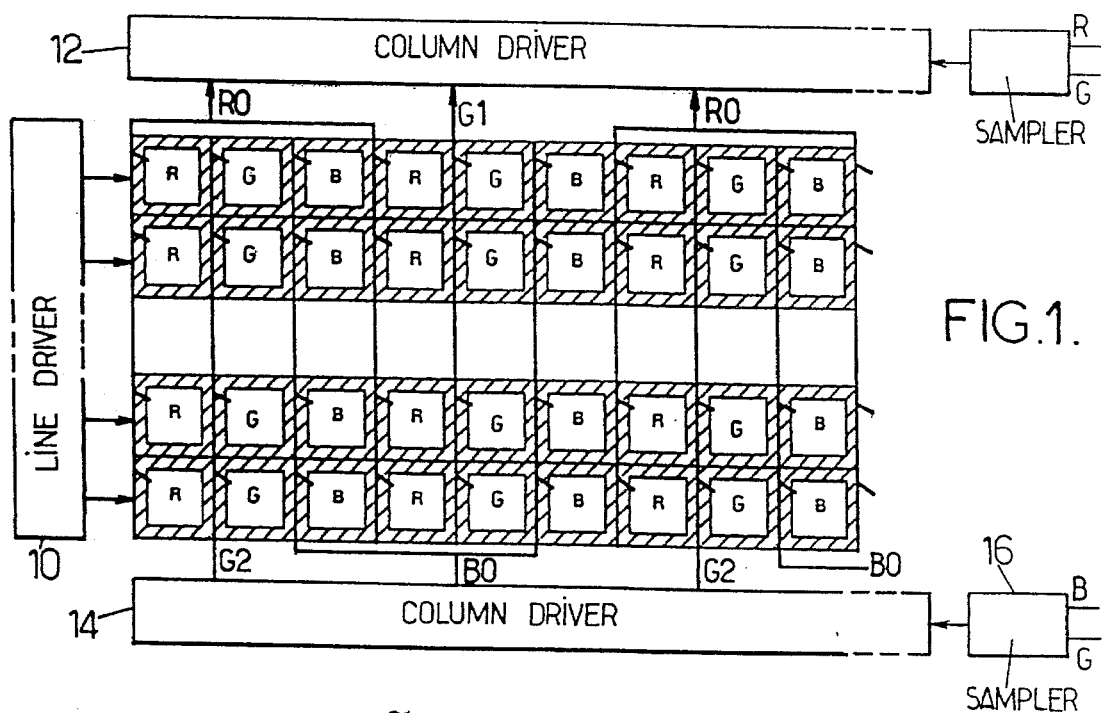
FIG. 1 is a block diagram showing a fraction of a display constituting a first embodiment of the invention.

In the embodiment shown in FIG. 1, the red, green and blue pixels (respectively referenced R, G and B) are uniformly distributed in a rectangular or square array. The columns of green pixels are each controlled by a respective column conductor. In contrast, the red pixel column conductors Ro are connected together in pairs so that the red information for a macropixel of order N on any given row is shared with macropixel N+1. Similarly, the blue pixel column conductors Bo are connected in pairs such that the blue information for the macropixel of order N is shared with macropixel N−1, or vice-versa.

In FIG. 1, it can be seen that if the first point on a row is red, then the second is green and the third is blue. Column conductors Ro of order 6K+1 et 6K+4 (where K is an integer) are connected in parallel. Similarly, column conductors Bo of order 6K+3 and 6K+6 are connected in parallel.

To avoid cross-overs between conductors, green pixel column conductors G1 and G2 are connected alternately to the bottom and to the top of the display screen. The "red" column conductors are connected to the top and the "blue" column conductors to the bottom.

Figure 3:
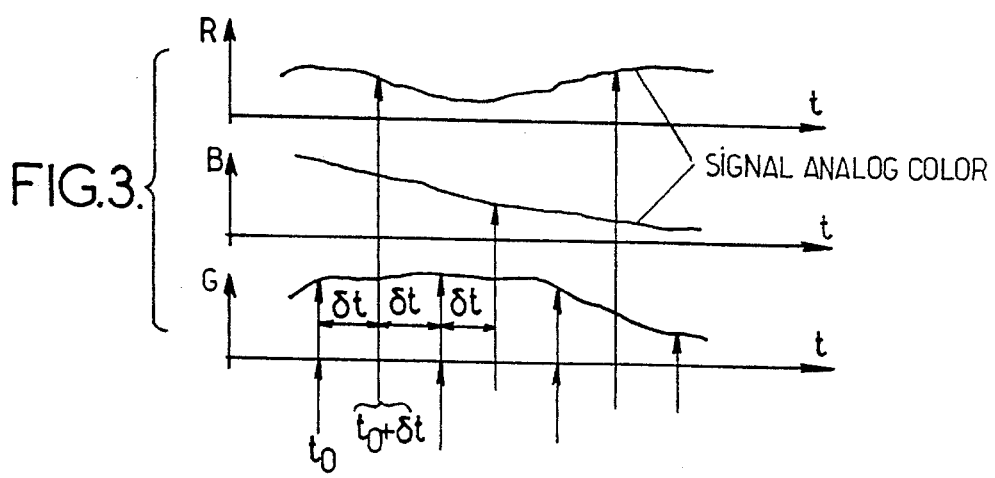
FIG. 3 is a timing diagram for showing the instants $t_0$, $t_0+\delta t$, . . . at which colour signals are sampled for controlling a display unit of the kind shown in FIG. 1.

The circuits driving the display may be of conventional structure and may include a row drive circuit 10 for addressing all the rows in sequence. The column drive circuit is split into two units 12 and 14, one controlling the red column conductors Ro and one out of two green column conductors V1. The unit 14 controls the other columns conductors. These two units may be constituted using a driving circuit that is commercially available and is intended for so called "quad" configurations. In conventional manner, the units 14 receive colour samples from samplers 16. The information delivered to a pixel is conserved up to the following addressing. The sampling rate is twice as high for the green pixels: in FIG. 3, it can be seen that the information applied to green pixels is updated with a period 2 δt, whereas the information concerning blue pixels and red pixels is updated with a period or at time intervals 4 δt.

Figure 2:
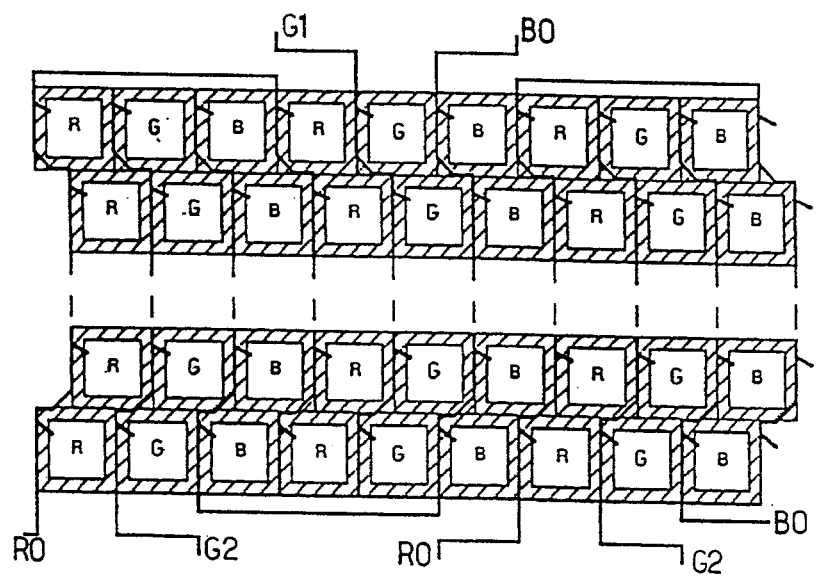
FIG. 2, similar to a fraction of FIG. 1, shows a modified embodiment.

In the modified embodiment shown in FIG. 2, the column conductors corresponding to two adjacent columns of the same colour are connected in series rather than in parallel. The pixels of successive rows are offset by a half-pitch spacing.

In both cases, the number of connections is reduced to two thirds the usual number of connections and the pitch is enlarged, which improves reliability. Furthermore, with an active matrix liquid crystal screen, redundancy is achieved for red pixels and for blue pixels since they are addressed in pairs, thereby improving manufacturing yield.

In the embodiment shown in FIG. 4, pixels corresponding to a given colour are in alignment, as they are in FIG. 1. However, on one row there are disposed in succession red, green, blue, green, red, etc . . . pixels and the useful area of the red pixels R and of the blue pixels B is twice the useful area of the green pixels G. The pixels diposed in a same column are allocated to a common column conductor which may pass between adjacent pixels. As in the preceeding case, the column conductors allocated to green pixels G may be distributed into two sub-sets G1 and G2 that are connected to different driving circuits. The conductors Bo and Ro may be respectively connected to different circuits, placed on opposite sides of the screen.

The modified embodiment shown in FIG. 5 differs from that to FIG. 4 solely in that two successive rows of pixels are offset from each other by a distance equal to the width of a green pixel. The column conductors G1 and G2 can remain rectilinear as they pass between adjacent pixels; on the other hand, the column conductors Ro and Bo now have to follow a crenelated path in order to pass between pixels, following the opaque rows, that are shaded in the drawing.

The embodiment shown in FIG. 6 differs from the preceeding embodiment solely in that the offset between pixels in two successive rows in equal to half the width of a green pixel G: in this case, all of the column conductors must follow a crenelated path.

In the embodiment of FIG. 7, the offset between two successive rows is the same as in the example of FIG. 5. The column conductors allocated to the green pixels are rectilinear. The other column conductors are not dedicated to a single colour. When row addressing switches the following row, the applied signal corresponds to a different colour. This embodiment has the advantage of distributing conductors more conveniently. As in FIGS. 1, 2 and 4, the number of connections is reduced to two thirds the number that was previously necessary. The distribution pitch is greater than that of conventional screens. In addition, the doubling in area of the blue pixels and of the red pixels reduces the number of columns that need to be implemented and increases the aperture coefficient. Furthermore, manufacturing yield is increased due to the reduction in the number of crossovers between row conductors and column conductors.

It can be seen that, in a configuration as shown in FIG. 5 to 7, a macropixel comprises a green pixel belonging to said macropixel and adjacent blue and red pixels that it shares with the adjacent macropixels.

Figure 8:
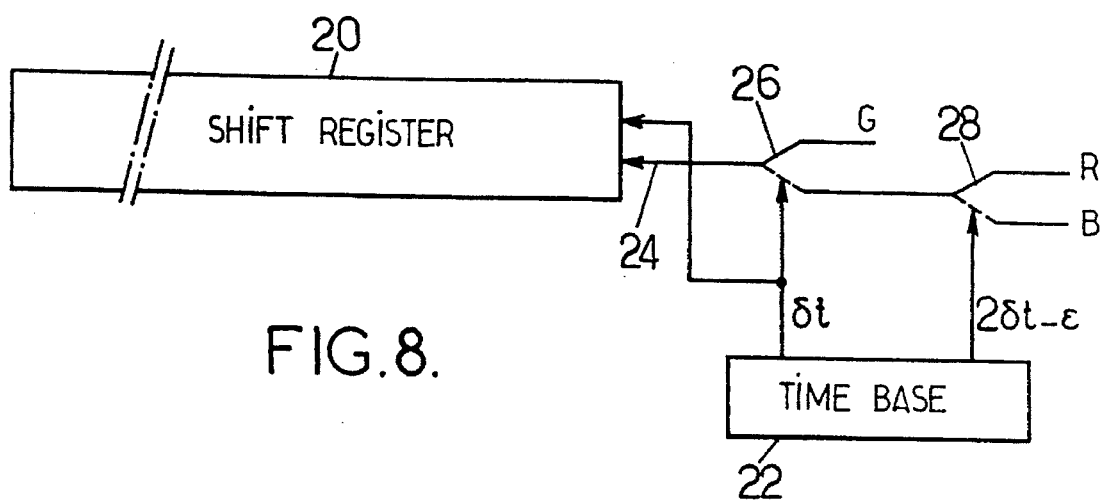
FIG. 8 is a block diagram showing one possible architecture for the inputs of a column driving circuit.
Figure 9:
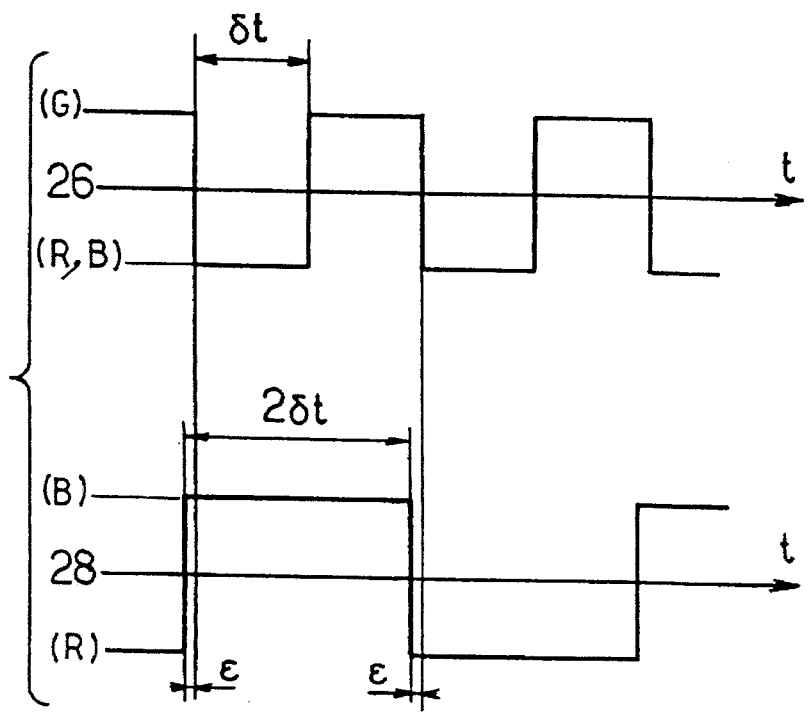
FIG. 9 is a timing diagram showing how controls are time distributed in the architecture of FIG. 8.

The unit shown in FIG. 8 comprises a shift register 20 in which shifting is caused by a clock signal of period δt delivered by a time base 22. The data input 24 of the shift register receives colour signals, referenced G, R and B through a set of switches. A first switch 26, controlled at period δt by the time base 22, connects the input 24 alternately to a first line delivery signal G and to a second line, as shown at 26 in FIG. 9. A switch 28 in series with the first switch and controlled at a rate ½ δt delivers the signals R and V in alternation. The switch 28 is switched before the switch 26, with a time advance E, as shown at line 28 in FIG. 9.

Thus, samples G, R, G, B, G, etc . . . travel in succession along the shift register 28.

The invention is not limited to the particular embodiments shown and described by way of example, and further modifications are possible within the scope of the following claims.

We claim:

1. A color matrix display unit comprising:
    a screen having at least three sets of pixels, all pixels in a same one of said three sets being of the same color among red, blue and green and all said pixels of a same one of said sets being distributed in a matrix arrangement comprising rows and columns;
    a plurality of column conductors each for simultaneously addressing all pixels in a same one of said columns;
    a plurality of row conductors each for simultaneously addressing all pixels in a same one of said rows;
    wherein the column conductors are so connected that each of the column conductors allocated to red or blue pixels addresses an overall pixel area that is about double the overall pixel area addressed by one of the column conductors allocated to a green pixel, and wherein drive circuit means are connected to said column conductors to address the green pixels with a time or space repetition period which is half the period for red and green pixels.

2. Display unit according to claim 1, wherein the red, green and blue pixels are regularly distributed in successive rows and have substantially the same area and the column connectors corresponding to the red and blue pixels control two adjacent columns of pixels having a same color simultaneously.

3. Display unit according to claim 2, wherein the column conductors are driven by a driving circuit having one unit placed on one side of the display unit and controlling column conductors for red pixels and half of the column conductors for green pixels, and another unit placed on the other side and controlling the column conductors for blue pixels and half the column conductors for green pixels.

4. Display unit according to claim 1, wherein the columns are each made up of pixels of the same color in alignment with one another.

5. Display unit according to claim 1, wherein the columns are each made up of pixels of the same color disposed in quincunx.

6. Display unit according to claim 1, wherein the area of each said green pixel is substantially half the area of each red or blue pixel.

7. Display unit according to claim 6, wherein each said row comprises alternating pixels in a sequence of red, green, blue, green, red, green . . . and each said column is controlled by a separate column conductor dedicated to one color.

8. Display unit according to claim 6, wherein one out of two column conductors is used in alternation for controlling red pixels in one row, and blue pixels in the following row while the other column conductors are used for controlling the green pixels.

9. Display unit according to claim 1, wherein the three sets of pixels have a same total light emissive area.

* * * * *